US008913177B2

(12) United States Patent
Suzuki et al.

(10) Patent No.: US 8,913,177 B2
(45) Date of Patent: Dec. 16, 2014

(54) FOCUS ADJUSTMENT APPARATUS HAVING A SENSOR WITH A PLURALITY OF MODES

(71) Applicant: Canon Kabushiki Kaisha, Tokyo (JP)

(72) Inventors: Yasuyuki Suzuki, Tokyo (JP); Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 13/718,353

(22) Filed: Dec. 18, 2012

(65) Prior Publication Data
US 2013/0162890 A1 Jun. 27, 2013

(30) Foreign Application Priority Data
Dec. 22, 2011 (JP) .................. 2011-280842

(51) Int. Cl.
H04N 5/232 (2006.01)
G03B 13/00 (2006.01)
(52) U.S. Cl.
CPC ................. H04N 5/23212 (2013.01)
USPC ....................................... 348/345

(58) Field of Classification Search
USPC ......................... 348/345, 349, 350
See application file for complete search history.

(56) References Cited

U.S. PATENT DOCUMENTS

| 2008/0145043 A1* | 6/2008 | Katayama et al. ............ 348/349 |
| 2009/0034955 A1* | 2/2009 | Kunishige et al. ............ 396/128 |
| 2009/0262233 A1* | 10/2009 | Nagahata et al. ............ 348/349 |
| 2012/0262623 A1* | 10/2012 | Taguchi ........................ 348/349 |

FOREIGN PATENT DOCUMENTS

| JP | 8-152551 A | 6/1996 |
| JP | 9-311269 A | 12/1997 |
| JP | 2001-021794 A | 1/2001 |

* cited by examiner

Primary Examiner — Gevell Selby
(74) Attorney, Agent, or Firm — Canon U.S.A., Inc. IP Division

(57) ABSTRACT

In a focus detection apparatus, a sensor includes a first mode for outputting via the signal line when respective stored charges corresponding to the first and the second AF areas have reached the predetermined charge amount, and a second mode for outputting via the signal line when respective stored charges corresponding to the first or the second AF areas have reached the predetermined charge amount.

11 Claims, 22 Drawing Sheets

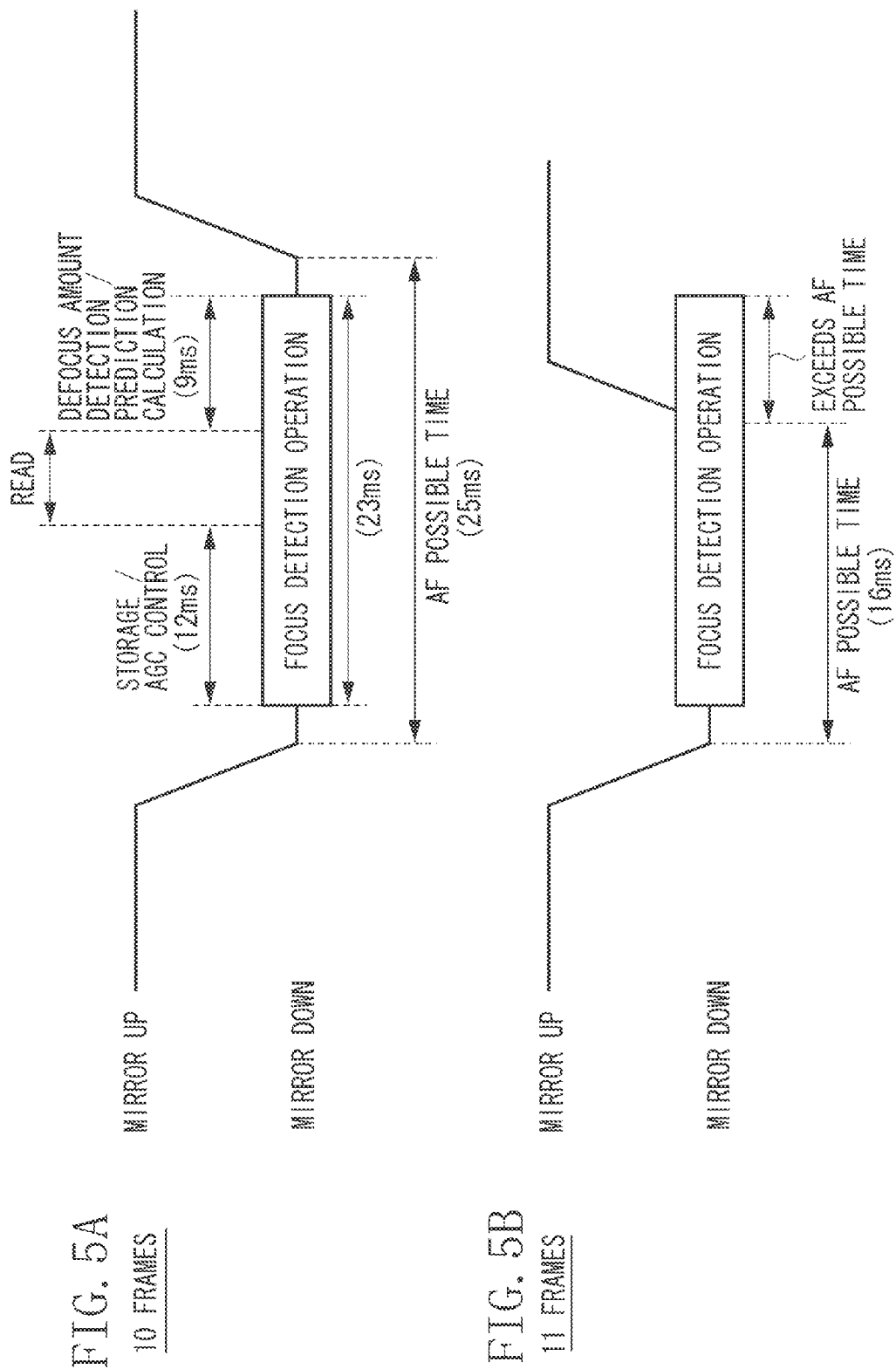

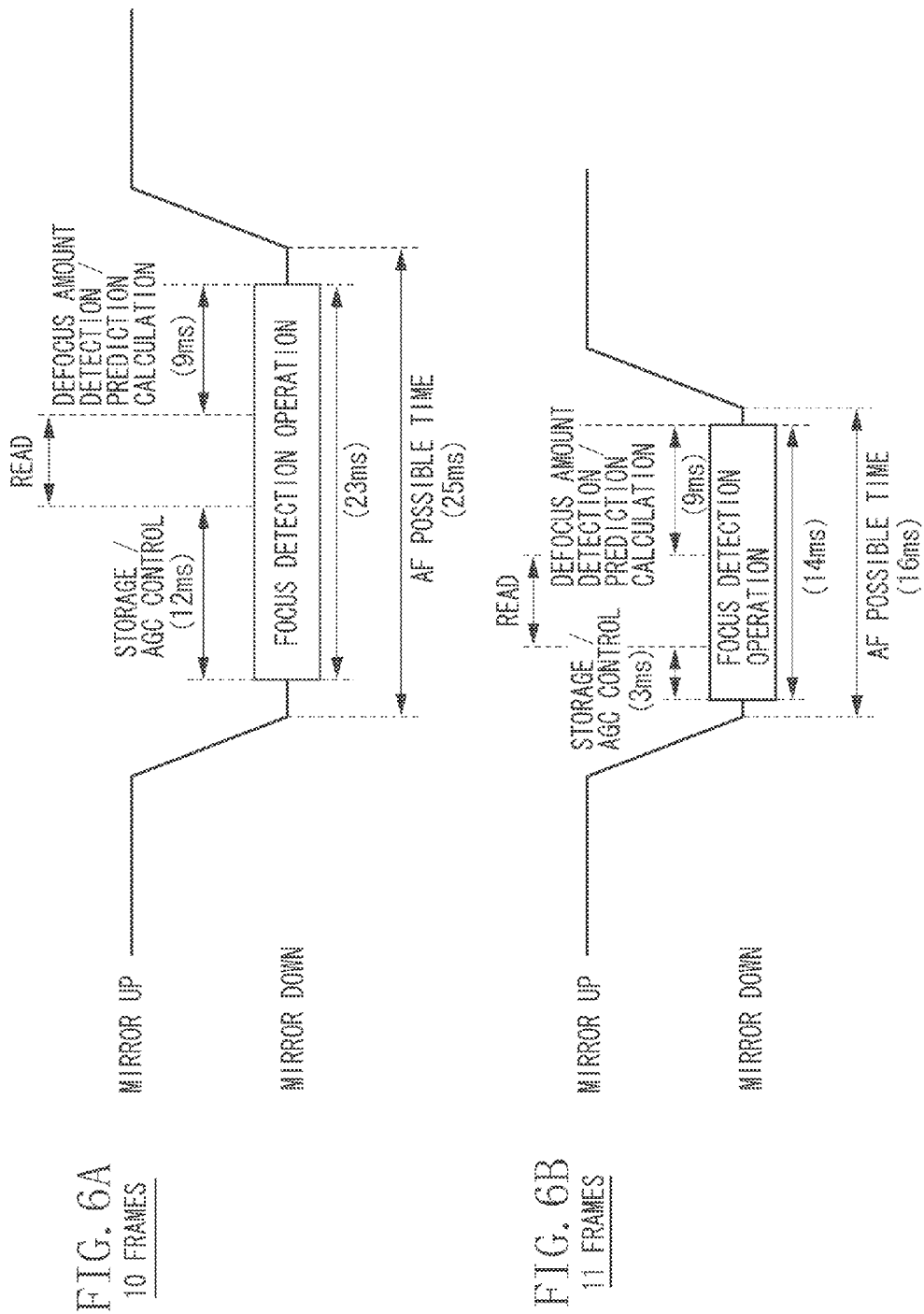

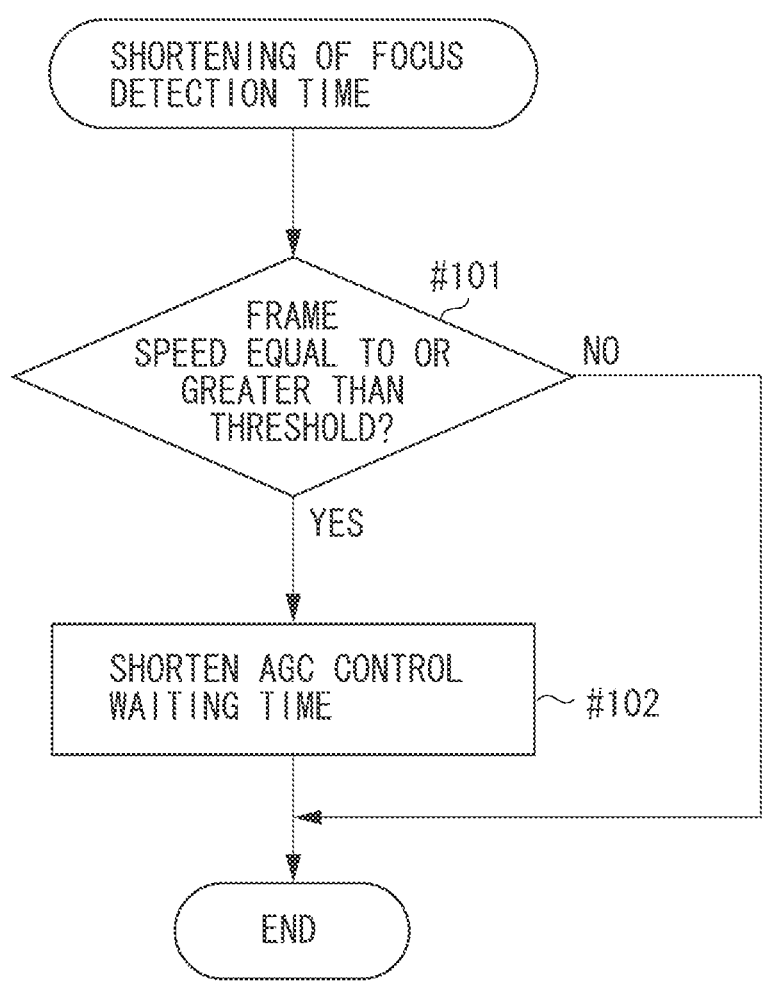

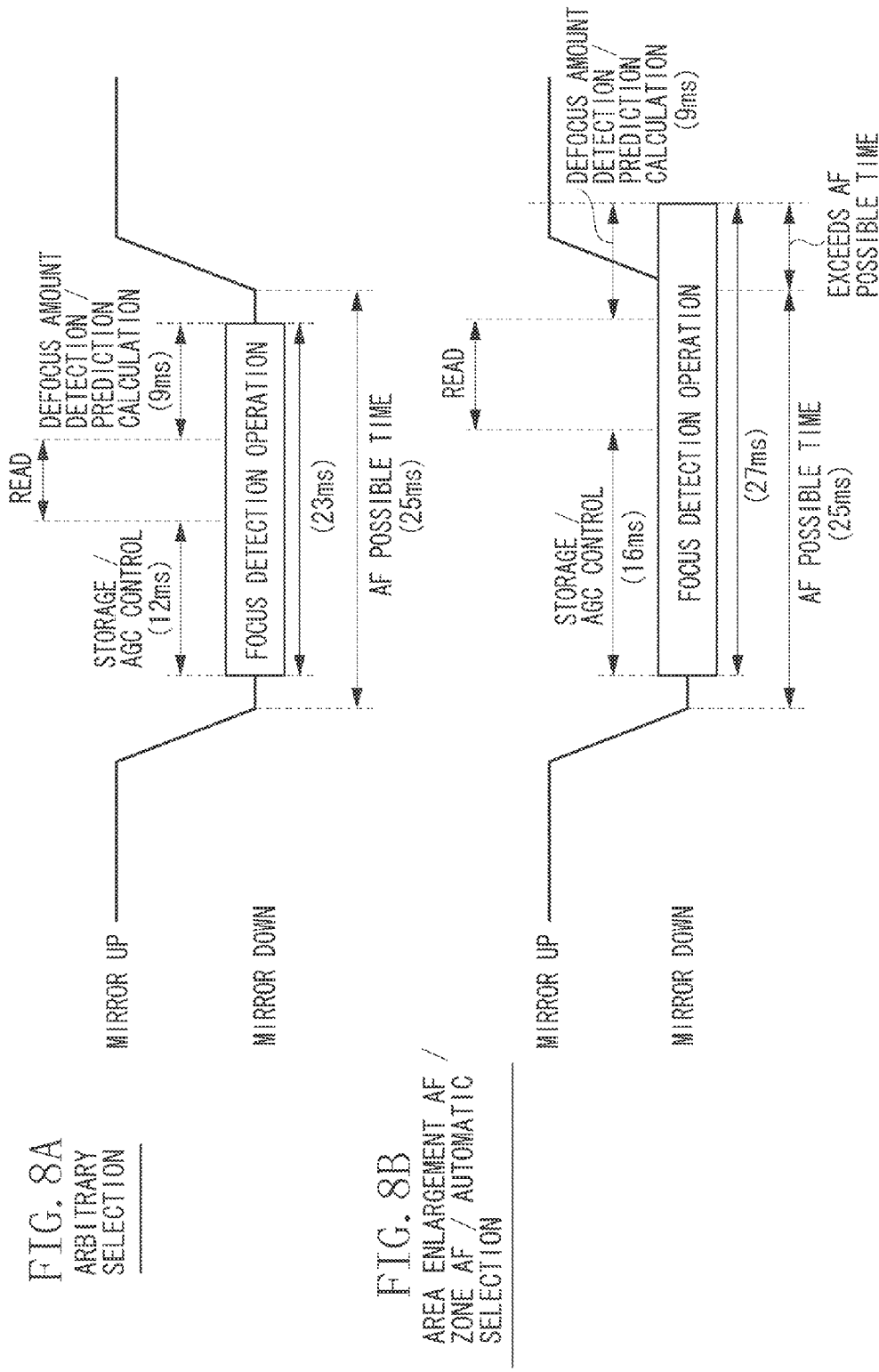

ARBITRARY SELECTION

AREA ENLARGEMENT AF / ZONE AF / AUTOMATIC SELECTION

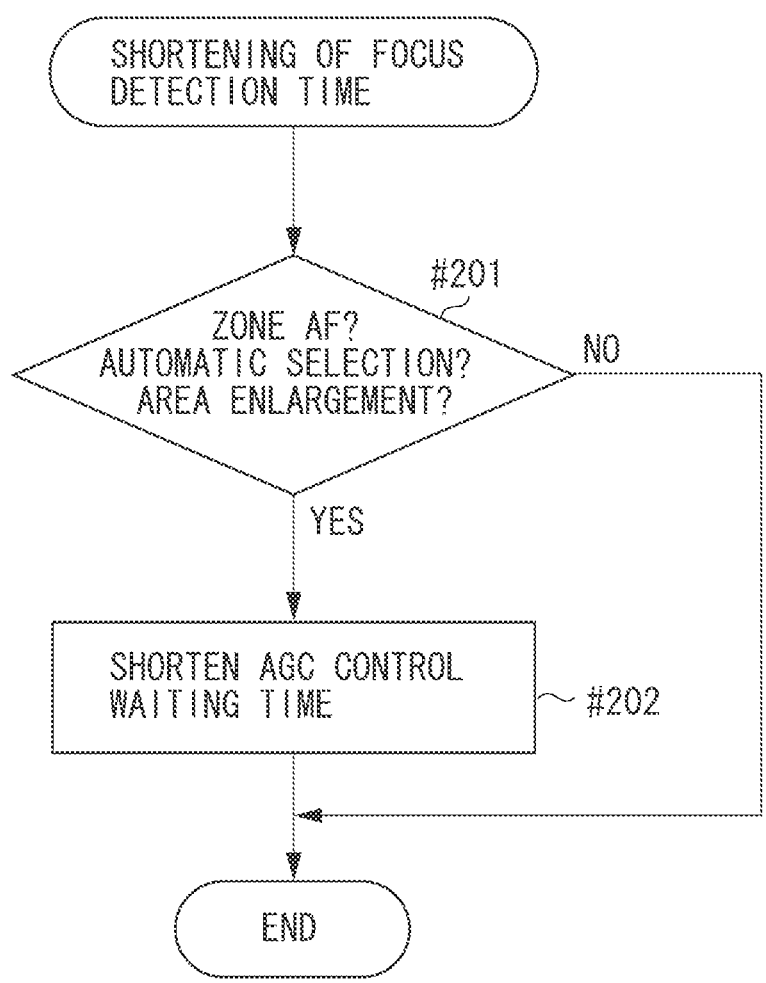

FOCUS PRIORITY

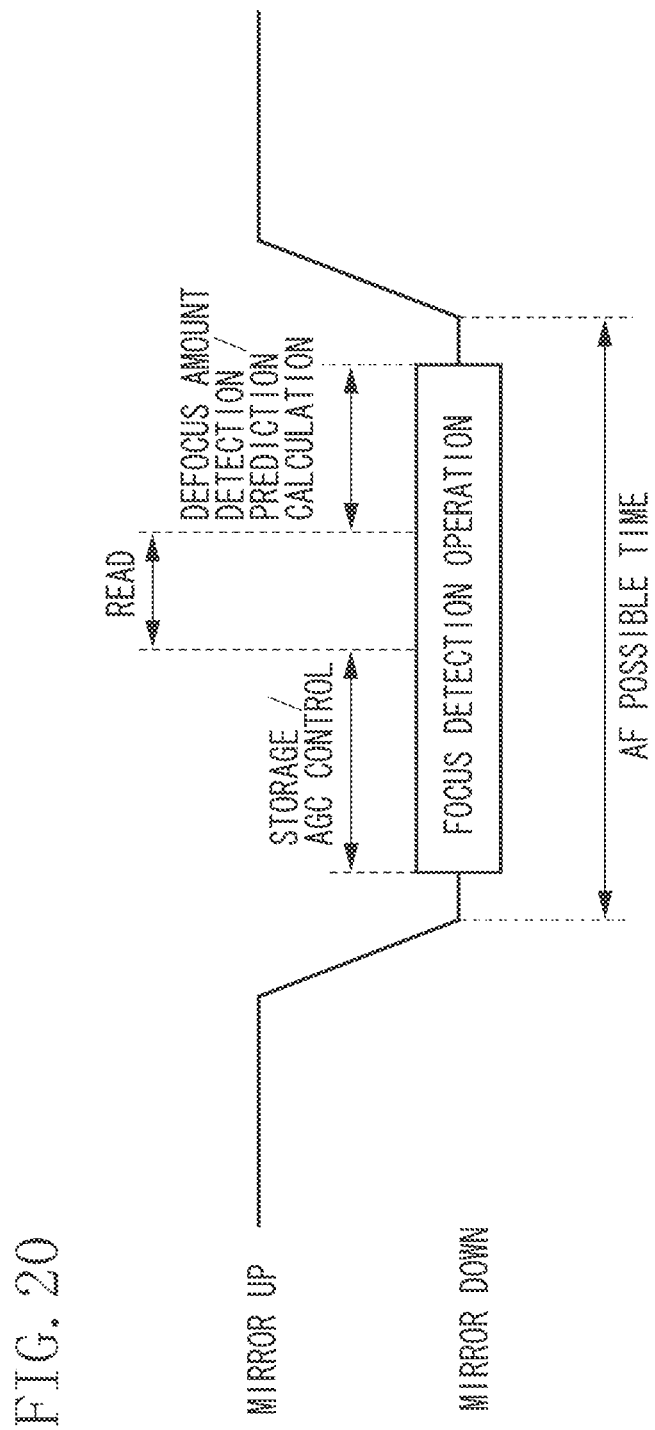

FOCUS ADJUSTMENT APPARATUS HAVING A SENSOR WITH A PLURALITY OF MODES

BACKGROUND OF THE INVENTION

1. Field of the Invention

The present invention relates to a focus adjustment apparatus used in a camera, for example.

2. Description of the Related Art

Conventionally, a camera focus detection apparatus has been known that stores object image signals that have passed through an imaging lens in an autofocus (AF) sensor, and detects a defocus amount based on the object image signals stored in the AF sensor.

In such a focus detection apparatus, when continuously focusing on a moving object, a prediction calculation function (AI-servo) moves the imaging lens by performing focus detection for each frame in continuous shooting to predict a future movement position of the object.

As illustrated in FIG. 20, the AI-servo calculates an amount deviating from the object by determining a defocus amount by performing a correlation calculation based on signals stored in the AF sensor. Next, the AI-servo performs a prediction calculation for predicting a future image plane position of the object, based on the determined focus detection result and past focus detection results, and drives the lens by an amount that takes into account the focus detection result and the prediction calculation result to continue the focus on the moving object.

Japanese Patent Application Laid-Open No. 2001-21794 discusses in detail control for driving an imaging lens in conjunction with movement of a moving object.

In the present invention, the operation from storage of the object image signals in the AF sensor, defocus amount detection by correlation calculation, up to prediction calculation is referred to as a focus detection operation. Generally, the focus detection operation is completed while the mirror is down, and imaging lens drive and aperture reduction are performed during the period from mirror up until exposure. This is because since it takes a predetermined amount of time to drive the lens and reduce the aperture, if the focus detection operation is not completed while the mirror is down, a finder vanishing time is extended, which makes it difficult for the user to track the object. In the present invention, the time that the mirror is down is referred to as AF possible time.

For the camera to maintain a continuous shooting speed (hereinafter, frame speed) during continuous shooting, the focus detection operation has to be finished within a predetermined time. However, the focus detection time can expand or shrink based on the shooting environment (object luminance, contrast), number of focus detection points, signal storage time at each focus detection point, reading amount of the signals, and prediction calculation amount. Consequently, the frame speed can be uneven. Especially, when continuously shooting at high speed, since the AF possible time that can maintain the frame speed shortens, the frame speed tends to become uneven.

Many technologies have been discussed that shorten the focus detection operation to maintain frame speed. For example, Japanese Patent Application Laid-Open No. 9-311269 discusses a method for shortening the time it takes for focus detection by placing an upper limit on the charge storage time in other AF sensors based on the charge storage time in the AF sensor of a selected focus detection area.

Auto gain control (hereinafter, AGC) is a technology that individually compares in the AF sensor a storage signal level with a predetermined signal level, and stops the storage operation when the storage signal has reached the predetermined signal level.

To reduce the size, lower the cost, and control the power consumption of an AF sensor, it is desirable to suppress as much as possible unevenness in the frame speed even when a storage signal cannot be immediately read after the charges are stored.

In AF sensor storage/AGC control, it is necessary to guarantee the focus detection accuracy by finishing the AGC control of the plurality of AF sensors after waiting for a predetermined time from storage of the charges in each line sensor has started until they are read, and then performing reading control of the charges.

FIG. 21A illustrates the storage/AGC control illustrated in FIG. 20 when the storage signals from line sensor A are read before storage of line sensor B is completed. Even if the AF sensor completes storage of line sensor B by stopping AGC control of line sensor B, during the reading of line sensor A, the AF sensor cannot stop storage. Therefore, the signals stored in line sensor B can be saturated in the period from the reading of line sensor A until AGC control restarts. Accordingly, as illustrated in FIG. 21B, saturation of line sensor B can be prevented by setting the AGC control waiting time longer, expecting that the storage stop processing will be performed appropriately even if storage of line sensor B is completed at the timing illustrated in FIG. 21A.

Japanese Patent Application Laid-Open No. 8-152551 discusses an AF sensor in detail.

However, because the focus detection accuracy is guaranteed, the focus detection time lengthens, so that frame speed unevenness tends to occur (FIG. 5). Further, unevenness in the frame speed also tends to occur when the continuous shooting frame speed has increased because the time that can be spent on the focus detection time shortens.

Further, if the number of focus detection points is large, it takes time to carryout the storage/reading of charges according to the number of AF sensors assigned to the focus detection points (FIG. 8). Consequently, since the focus detection time becomes longer than the current focus detection time, unevenness in the frame speed tends to occur.

In a camera that can be set by a user to focus priority or shooting speed priority, if the same focus detection control is performed for focus priority and shooting speed priority, because the same focus detection accuracy is maintained, the focus detection time lengthens, so that unevenness in the continuous shooting speed (hereinafter, frame speed) tends to occur (FIG. 11).

There is trade off between maintaining a permissible maximum AF possible time and frame speed. Consequently, it is necessary to determine based on a user's shooting setting whether to emphasize the permissible maximum AF possible time or emphasize maintaining frame speed.

SUMMARY OF THE INVENTION

According to an aspect of the present invention, a focus detection apparatus includes a sensor configured to photoelectrically convert an object image signal corresponding to first and second AF areas and output the converted signal via a signal line, wherein a storage time during photoelectric conversion is controlled by the sensor monitoring stored charges via the signal line, and wherein the sensor monitors whether the stored charges have reached a predetermined charge amount, and a controller configured to detect a defocus amount from the object image signal, wherein the controller performs focus adjustment of an imaging lens based on the defocus amount.

The sensor includes a first mode for outputting via the signal line when respective stored charges respectively corresponding to the first and the second AF areas have reached the predetermined charge amount, and a second mode for outputting via the signal line when respective stored charges corresponding to the first or the second AF areas have reached the predetermined charge amount.

According to the present invention, to reduce the size, lower the cost, and control the power consumption of an AF sensor, unevenness in shooting speed during continuous shooting can be suppressed as much as possible even when a storage signal cannot be immediately read after the charges are stored.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B illustrate the occurrence of unevenness in frame speed when frame speed has increased, according to the first exemplary embodiment.

FIGS. 6A and 6B illustrate adjustment of an AGC control waiting time when frame speed has increased.

FIG. 7 is a flowchart illustrating processing for adjusting an AGC control waiting time based on a user's frame speed setting.

FIGS. 8A and 8B illustrate the occurrence of unevenness in frame speed when a storage/read number to an AF sensor has increased.

FIG. 10 is a flowchart illustrating processing for adjusting an AGC control waiting time based on a focus detection point selection set by a user.

FIG. 20 illustrates a conventional AF sensor control method.

DESCRIPTION OF THE EMBODIMENTS

Various exemplary embodiments, features, and aspects of the invention will be described in detail below with reference to the drawings.

Exemplary embodiments according to the present invention will now be described based on the following first and second exemplary embodiments.

Figure 1:
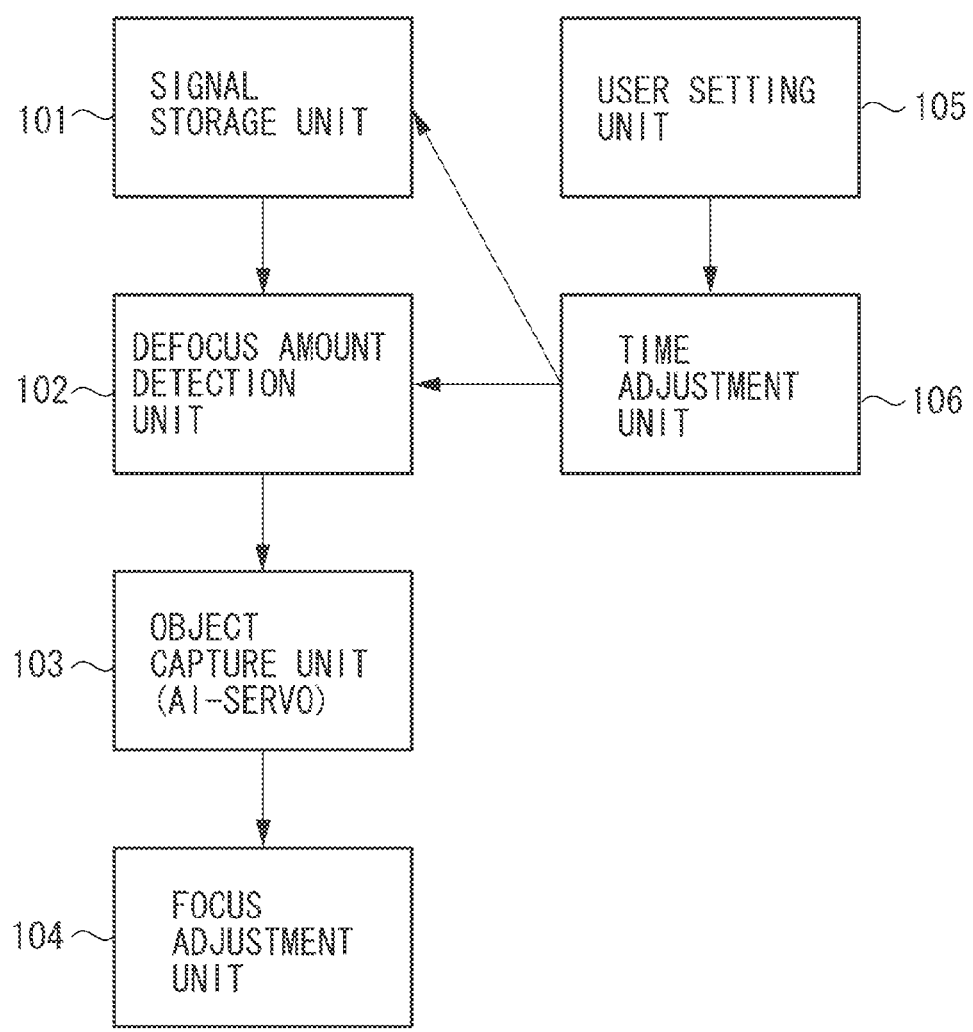
FIG. 1 is a block diagram illustrating a concept of a focus adjustment apparatus according to a first exemplary embodiment of the present invention.
Figure 2A:
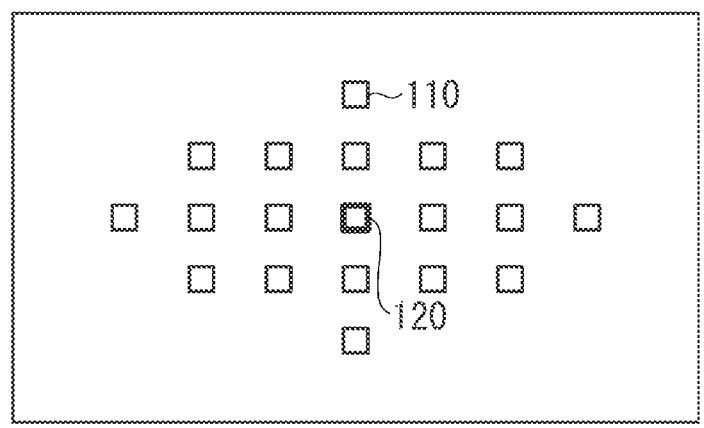
FIGS. 2A, 2B, 2C, and 2D illustrate a selection mode of a focus detection point selection setting according to the first exemplary embodiment.
Figure 2B:
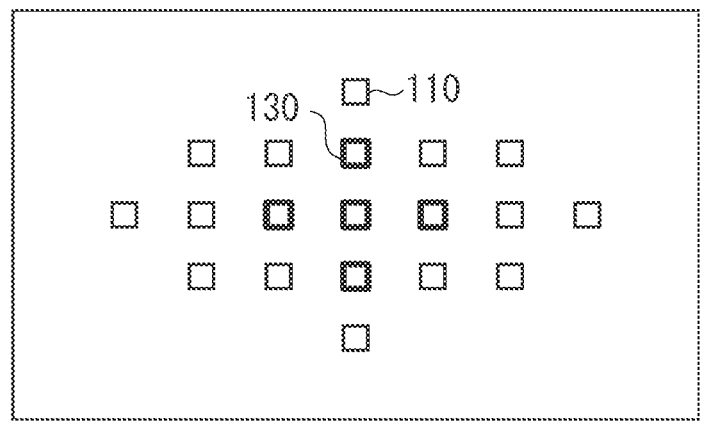
Figure 2C:
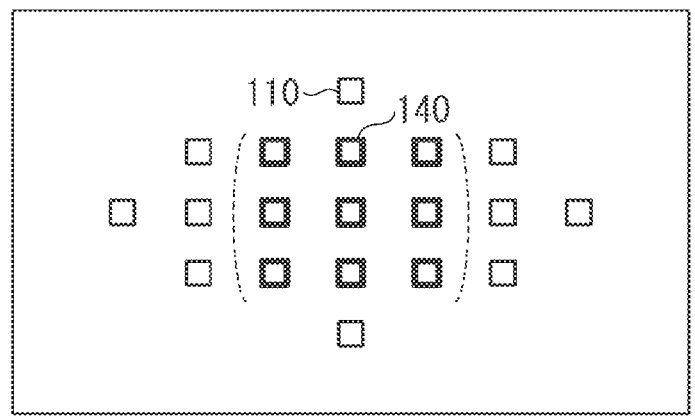
Figure 2D:
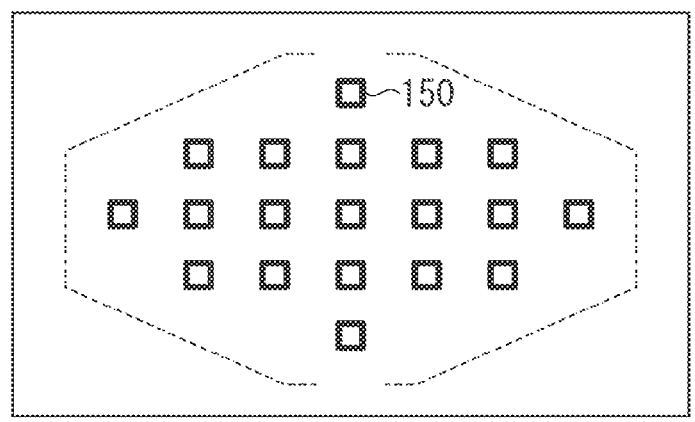

FIG. 1 is a block diagram illustrating a concept of a focus adjustment apparatus according to a first exemplary embodiment of the present invention. In FIG. 1, the focus adjustment apparatus includes a signal storage unit 101 for storing object image signals in a pair of AF sensors configured of a photoelectric conversion element array and a defocus amount detection unit 102 for detecting a defocus amount from the object image signals. Further, the focus detection apparatus includes a focus adjustment unit 104 for performing focus adjustment of an imaging lens based on the defocus amount, and an object capture unit (AI-servo) 103 that makes the imaging lens continue to focus on a moving object.

The focus detection apparatus also includes a user setting unit 105 that allows a user to individually set a frame speed setting, which effects the set shooting speed (frame speed), a focus detection point selection setting, and shooting speed priority/focus priority. In addition, the focus detection apparatus includes a time adjustment unit 106 for adjusting the focus detection time, during continuous shooting from the signal storage unit 101 until the object capture unit 103 based on a user setting made in the user setting unit 105. The signal storage unit 101, the defocus amount detection unit 102, and the object capture unit 103 perform a focus detection operation.

The focus detection time is the time from storage start in the AF sensors until the focus detection operation finishes, during continuous shooting. The term focus detection operation finish means that detection of the defocus amount by the defocus amount detection unit has finished, and at the AI-servo a prediction calculation performed by the object capture unit has finished.

The focus detection point selection setting is a setting made by selecting one of the four modes illustrated in FIG. 2. FIG. 2A illustrates an arbitrary selection mode in which focus detection is performed at a point 120 among arbitrary focus detection points 110. FIG. 2B illustrates an area enlargement selection mode formed from an arbitrarily selected focus detection point 110 and a focus detection point 130 adjacent thereto. FIG. 2C illustrates a zone selection mode that performs focus detection by dividing all of the focus detection points into a plurality of zones. In FIG. 2C, all of the focus detection points 140 in the zone enclosed by the dotted line are selected and set. FIG. 2D illustrates an automatic selection mode in which focus detection is performed on all of the focus detection points 150.

Shooting speed priority is a mode in which shooting is performed by giving priority to the frame speed set by the user over focus detection accuracy. Consequently, there is little frame speed unevenness.

In contrast, focus priority is a mode in which shooting is performed by giving priority to focusing on an object over frame speed unevenness. Specifically, shooting speed priority and focus priority are trade off.

Figure 3:
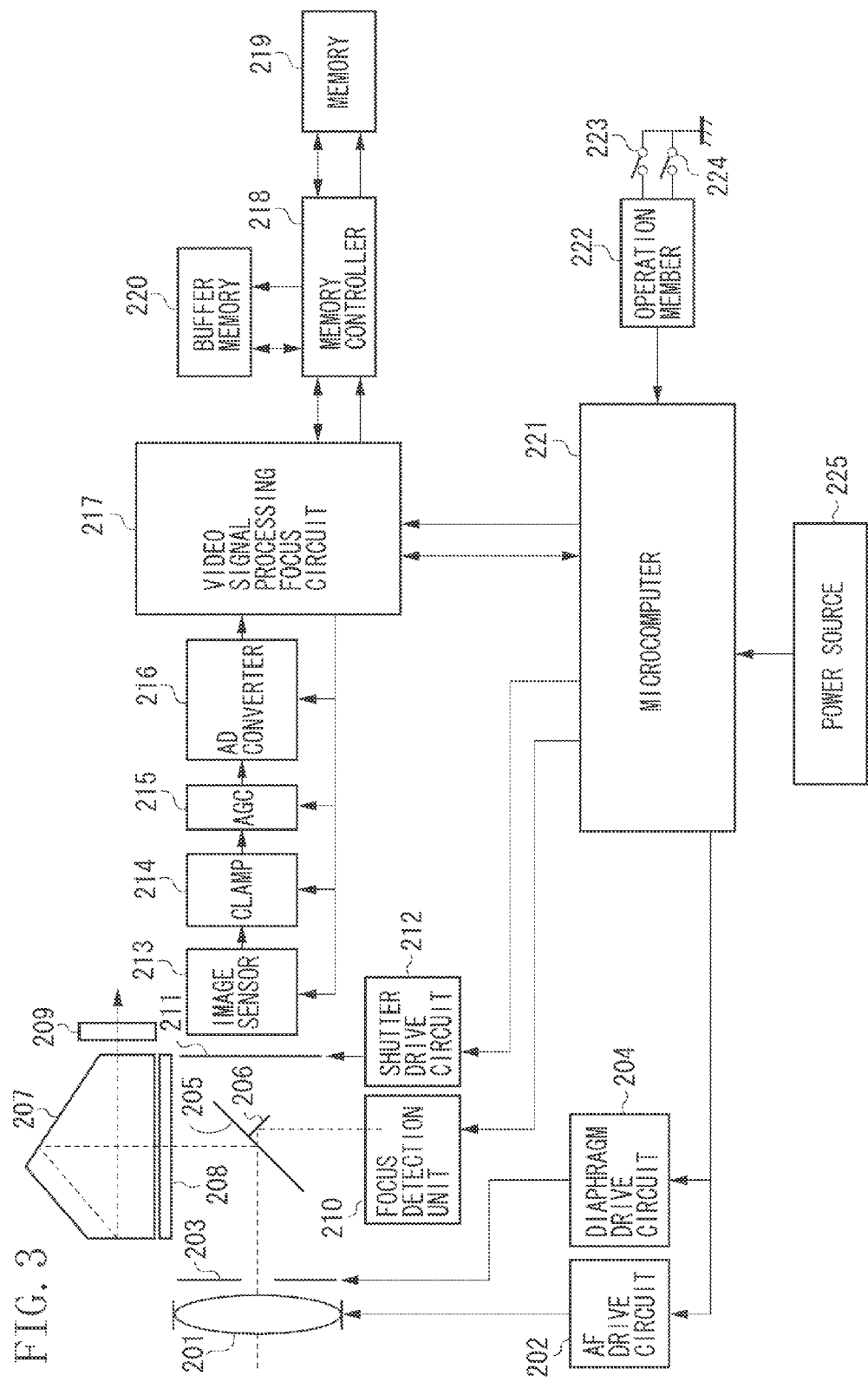
FIG. 3 is a block diagram illustrating a configuration of a single-lens reflex camera including the focus adjustment apparatus according to the first exemplary embodiment.

FIG. 3 is a block diagram illustrating a configuration of a single-lens reflex camera including the focus adjustment apparatus according to the first exemplary embodiment.

The illustrated configuration includes an imaging lens 201 and an autofocus (AF) drive circuit 202. The AF drive circuit 202 is configured of a direct current (DC) motor or a ultrasonic wave motor, for example, and adjusts the focus by changing a focus lens position of the imaging lens 201 based on control by a microcomputer 221.

The configuration illustrated in FIG. 3 also includes a diaphragm 203 and a diaphragm drive circuit 204. The diaphragm drive circuit 204 drives the diaphragm 203. The drive amount is calculated by the microcomputer 221. This drive amount changes an optical diaphragm value.

A main mirror 205 is a mirror for switching the light beams that comes from the imaging lens 201, between a finder side and an image sensor side. The main mirror 205 is normally provided so as to guide and reflect light beams to the finder. However, when shooting is being performed, the main mirror 205 jumps up and is retracted from the light beams so that the light beams are guided to an image sensor 213. Further, the main mirror 205 is configured as a half-mirror whose center portion allows part of the light beams to pass through. Consequently, a part of the light beams passes the mirror through and hits a pair of AF sensors 229a and 229b (FIG. 4) to perform focus detection.

A sub-mirror 206 is a mirror for reflecting the light beams that have passed through the main mirror 205, and guiding them to the pair of AF sensors 229a and 229b (which are arranged in a focus detection unit 210) to perform focus detection.

The configuration illustrated in FIG. 3 also includes a pentaprism 207 constituting a finder. The finder is also configured of a focus plate 208, an eyepiece 209 and the like.

The configuration illustrated in FIG. 3 also includes a focus detection unit 210. The light beams reflected by the sub-mirror 206 reach the pair of AF sensors 229a and 229b for performing photoelectric conversion, arranged in the focus detection unit 210. A defocus amount, which represents the focus adjustment state of the imaging lens 201 with respect to the object, is determined by calculating the outputs from the pair of AF sensors 229a and 229b. The microcomputer 221 drives the focus lens in the imaging lens 201 by evaluating the calculation result and issuing an instruction to the AF drive circuit 202.

The configuration illustrated in FIG. 3 also includes a focal plane shutter 211, and a shutter drive circuit 212, which drives the focal plane shutter 211. The duration that the focal plane shutter 211 is open is controlled by the microcomputer 221.

The image sensor 213, which is a charged-couple device (CCD) or a complementary metal-oxide-semiconductor (CMOS), for example, converts an object image formed by the imaging lens 201 into an electric signal. A clamp circuit 214 and an AGC circuit 215 perform basic analog signal processing that is performed before analog/digital (A/D) conversion. A clamp level and an AGC reference level are changed by the microcomputer 221.

An A/D convertor 216 converts an analog output signal from the image sensor 213 into a digital signal. A video signal processing circuit 217 is realized by a logic device, such as a gate array. The configuration illustrated in FIG. 3 also includes a memory controller 218, a memory 219, and a buffer memory 220.

The video signal processing circuit 217 performs filter processing, color conversion processing, and gamma processing on the digitalized image data, as well as compression processing, such as joint photographic experts group (JPEG), and outputs the processed data to the memory controller 218.

The video signal processing circuit 217 can output to the microcomputer 221 information, such as exposure information and white balance information, about the signals from the image sensor 213 as necessary. Based on this information, the microcomputer 221 issues an instruction about white balance and gain adjustment. In a continuous shooting operation, continuous shooting is performed by temporarily storing the imaging data in the buffer memory 220 as an unprocessed image, reading the unprocessed image data via the memory controller 218, and performing image processing and compression processing in the video signal processing circuit 217. The number of continuous shooting images depends on the size of the buffer memory 220.

The memory controller 218 stores the unprocessed digital image data input from the video signal processing circuit 217 in the buffer memory 220, and the processed digital image data in the memory 219. Conversely, image data from the buffer memory 220 and the memory 219 is output to the video signal processing circuit 217. The memory 219 can also be removable.

An operation member 222 transmits the state of the operation member 222 to the microcomputer 221. The microcomputer 221 controls the various units based on the changes in the operation member 222.

Further, the operation member 222 can perform a switching operation between a one shot mode that is suited to shooting a still object, an AI-servo mode that is suited to shooting an object whose shooting distance is always changing, and an AI-focus mode that automatically switches from one shot to AI-servo based on the state of the object.

A switch 1 (hereinafter, SW1) 223 and a switch 2 (hereinafter, SW2) 224 are switches that are turned on and off by a release button operation. Both of these switches are one of the input switches on the operation member 222. When the switch SW1 only is on, the release button is in a half-depressed state. In this state, an autofocus operation and a light metering operation are performed.

When the switches SW1 and SW2 are on, the release button is in a fully depressed state and turned on to record an image. In this state, shooting is performed. Further, while the switches SW1 and SW2 remain on, continuous shooting is performed. Other switches, such as an ISO setting button, an image size setting button, an image quality button, and an information display button (these buttons are not illustrated) are connected to the operation member 222, and the state of the switches is being detected.

A power source 225 supplies the power that is necessary for the various integrated chips (IC) and drive systems.

Figure 4:
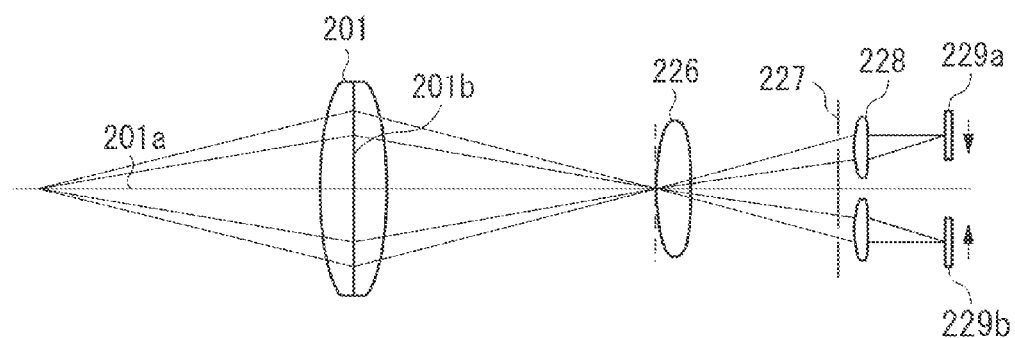
FIG. 4 illustrates a schematic configuration of a focus detection unit.

FIG. 4 illustrates a schematic configuration of the focus detection unit 210. Constituent parts that are the same as the constituent parts in FIG. 3 are represented using the same reference numerals. Further, in FIG. 4, the respective constituent parts are illustrated along the optical axis of the imaging lens 201. However, in FIG. 4, the main mirror 205 and the sub-mirror 206 are omitted.

The focus detection unit 210 is configured of a field lens 226, a diaphragm 227 having a pair of openings, a pair of secondary image-forming lenses 228, and a pair of AF sensors 229a and 229b that include a photoelectric conversion element array.

Light beams coming from a point on the optical axis 201a passes through the imaging lens 201, then form an image on the image sensor 213 and form an image at a fixed interval on the pair of AF sensors 229a and 229b via the field lens 226, the diaphragm 227, and the secondary image-forming lenses 228.

The field lens 226 is arranged so as to form an image near a pupil 201b of the imaging lens 201 and an incident pupil, i.e., the diaphragm 227, of the pair of secondary image-forming lenses 228. Further, the field lens 226 divides the pupil 201b of the imaging lens 201 in the vertical direction illustrated in FIG. 4 corresponding to the pair of openings of the diaphragm 227.

In such a configuration, for example, if the imaging lens 201 is moved to the left in FIG. 4, so that the light beams form an image to the left of the image sensor 213, the pair of images on the pair of AF sensors 229a and 229b is displaced in the direction of the arrow. The relative displacement amount of this pair of images is detected by the pair of AF sensors 229a and 229b, which enables the focus detection of the imaging lens 201 as well as the focus adjustment drive of the imaging lens 201. If the imaging lens 201 is moved to the right in FIG. 4, the pair of images on the pair of AF sensors 229a and 229b is displaced in the opposite direction.

The focus detection of the imaging lens 201 is performed using a focus detection unit 210 such as that described above.

Optimum focus detection is performed by controlling the AF sensors 229a and 229b with the thus-configured camera.

Next, a control method of the AF sensors 229a and 229b according to the first exemplary embodiment of the present invention will be described with reference to FIG. 5.

In the focus detection performed by the AF sensors 229a and 229b, after starting storage, the sensors wait for a predetermined time (reading waiting time) to perform AGC control. Then, the charges stored in the AF sensors 229a and 229b are read.

In the first exemplary embodiment, in the case of a user setting in which frame speed unevenness tends to occur due to an extension of the focus detection time, this frame speed unevenness is mitigated by hastening the reading of the object image signals to shorten the focus detection time, while slightly sacrificing AGC control.

The first time shortening process according to the first exemplary embodiment shortens the focus detection time by shortening the AGC control waiting time until the object image signals are read based on a frame speed set by the user.

FIG. 5A illustrates the time during which a focus detection operation can be performed per frame when the frame speed is, for example, 10 frames. FIG. 5B illustrates the time during which a focus detection operation can be performed per frame when the frame speed is, for example, 11 frames.

Supposing that the frame speed is 10 frames and the AF possible time that can be spent for one frame is 25 ms while the focus detection time takes 23 ms, the focus detection time is within the AF possible time. However, if the frame speed is 11 frames and the focus detection time is the same as in the case of 10 frames, the focus detection time is no longer within the AF possible time of 16 ms.

Consequently, the camera tries to extend the AF possible time, so that the frame speed falls to less than 11 frames. In this case, by shortening the AGC control waiting time to hasten the reading start of the signal, the focus detection time will be within the AF possible time. FIG. 6B illustrates a case in which the focus detection time (14 ms) has been adjusted to be within the AF possible time (16 ms) by shortening the AGC control waiting time to 3 ms to hasten signal reading start.

By shortening the AGC control waiting time, reading start of the signals from a line sensor that has completed storage before the AGC control waiting time can be hastened. However, since during reading, the AGC control of other line sensors is stopped, the storage signals can become saturated. By shortening the AGC control waiting time, even if the second and subsequent line sensors are saturated, the storage signals from the line sensor that was first read are not saturated. Therefore, the defocus amount can be determined using at least one or more line sensors that are not saturated.

Thus, by shortening the AGC control waiting time to shorten the focus detection time, the focus detection time fits within the AF possible time, and unevenness in the frame speed is mitigated.

FIG. 7 is a flowchart illustrating processing for shortening an AGC control waiting time based on a frame speed setting made by the user.

In step S101, if it is determined that the frame speed set by the user is equal to or greater than a predetermined threshold (YES in step S101), the processing proceeds to step S102. In step S102, the AGC control waiting time is set to be shorter than the current time. If it is determined in step S101 that the frame speed set by the user is less than the predetermined threshold (NO in step S101), the processing is finished with no change to the current AGC control waiting time setting.

The second time shortening process according to the first exemplary embodiment is performed to shorten the focus detection time by shortening the AGC control waiting time when a user setting is zone selection, automatic selection, or area enlargement selection. First, the occurrence of frame speed unevenness in such cases will be described with reference to FIG. 8.

If the focus detection point selection set by the user is zone selection, automatic selection, or area enlargement selection, compared with arbitrary selection, the number of line sensors performing storage/reading increases, and the focus detection time is extended. Supposing that for arbitrary selection the AF possible time is 25 ms and the focus detection time takes 23 ms, the focus detection time is within the AF possible time. However, if the number of focus detection points increases, as in area enlargement selection, the number of line sensors performing storage/reading increases, so the focus detection time is extended (27 ms). Consequently, the focus detection time no longer fits within 25 ms.

In this case, by shortening the AGC control waiting time to hasten the reading start of the signal, the focus detection time will be within the AF possible time.

Figures 9A, 9B:
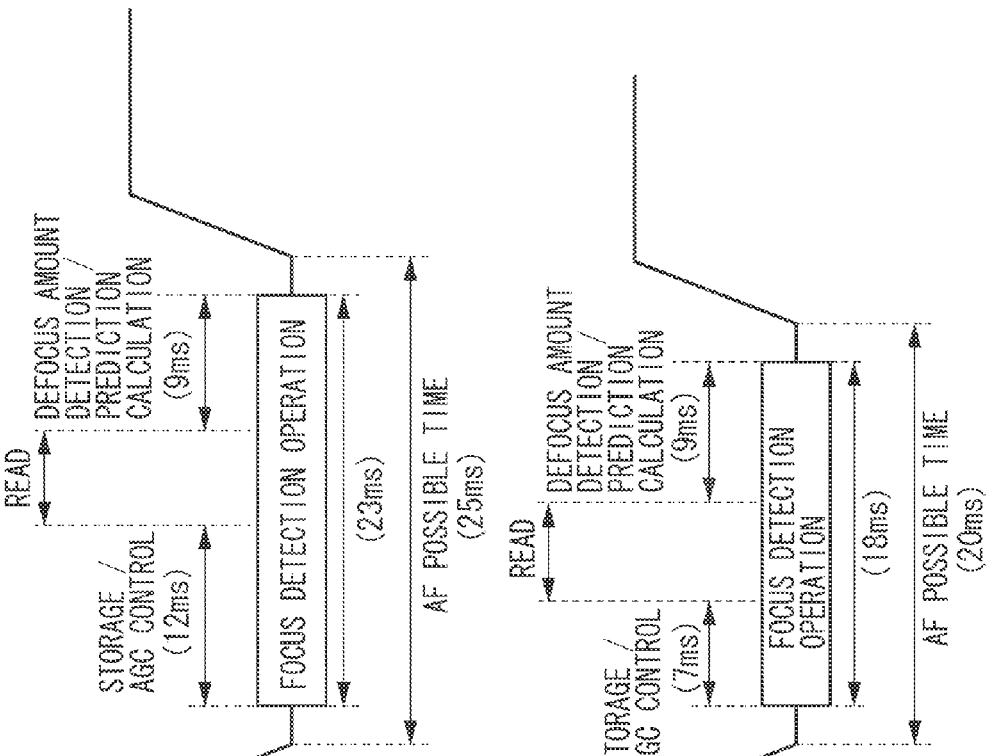
FIGS. 9A and 9B illustrate adjustment of an AGC control waiting time when a storage/read number to an AF sensor has increased.

FIG. 9 illustrates a case in which the focus detection time has been adjusted to 18 ms by shortening the AGC control waiting time to 5 ms to hasten signal reading start, so that the focus detection time is within the AF possible time (20 ms).

Thus, by shortening the AGC control waiting time to shorten the focus detection time, the focus detection time fits within the AF possible time, and unevenness in the frame speed is mitigated.

Similarly, in the cases of zone selection and automatic selection too, since the number of line sensors is more than arbitrary selection, the time taken for storage/reading increases, and the focus detection time lengthens. In these cases also, frame speed unevenness is mitigated by hastening the reading of the signals to shorten the focus detection time, while slightly sacrificing AGC control.

FIG. 10 is a flowchart illustrating processing for shortening an AGC control waiting time based on a focus detection point selection set by the user.

In step S201, if it is determined that the focus detection point selection set by the user is zone selection, automatic selection, or area enlargement selection (YES in step S201), the processing proceeds to step S202. In step S202, the AGC control waiting time is set to be shorter than the AGC control waiting time set for arbitrary selection.

If it is determined in step S201 that the focus detection point set by the user is one (NO in step S201), the processing is finished with no change to the current AGC control waiting time setting.

Figure 11:
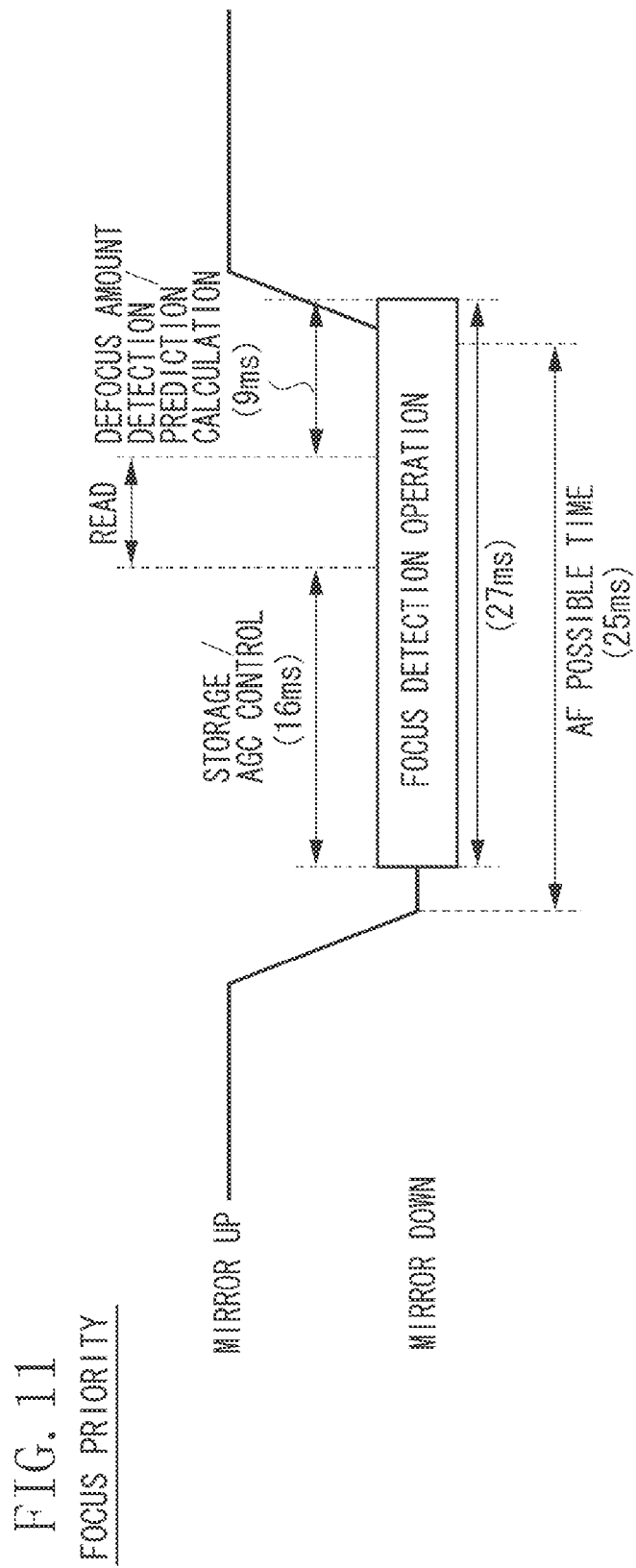
FIG. 11 illustrates the occurrence of unevenness in frame speed when focus priority is set.

The third time shortening process according to the first exemplary embodiment is performed to shorten the focus detection time by shortening the AGC control waiting time based on shooting speed priority. First, the occurrence of frame speed unevenness when the user setting is focus priority will be described with reference to FIG. 11.

In a case where shooting can be performed without the occurrence of frame speed unevenness with an AF possible time of 25 ms, for example, if the user selects focus priority, focus detection accuracy is given priority. Consequently, the focus detection time may now take 27 ms, which is not within the AF possible time, so that frame speed unevenness occurs. However, since focus priority is a shooting mode chosen by the user to emphasize focus detection accuracy over a shooting speed priority, unevenness in the frame speed can be permitted even if it occurs.

On the other hand, shooting speed priority performs shooting by emphasizing a set frame speed. Therefore, the user definitely does not want frame speed unevenness to occur as a consequence of the focus detection time not fitting within the AF possible time because of an extension of the focus detection time.

Therefore, when shooting speed priority is set, the focus detection time is adjusted to be within the AF possible time by shortening the AGC control waiting time to hasten the signal reading start.

Figure 12:
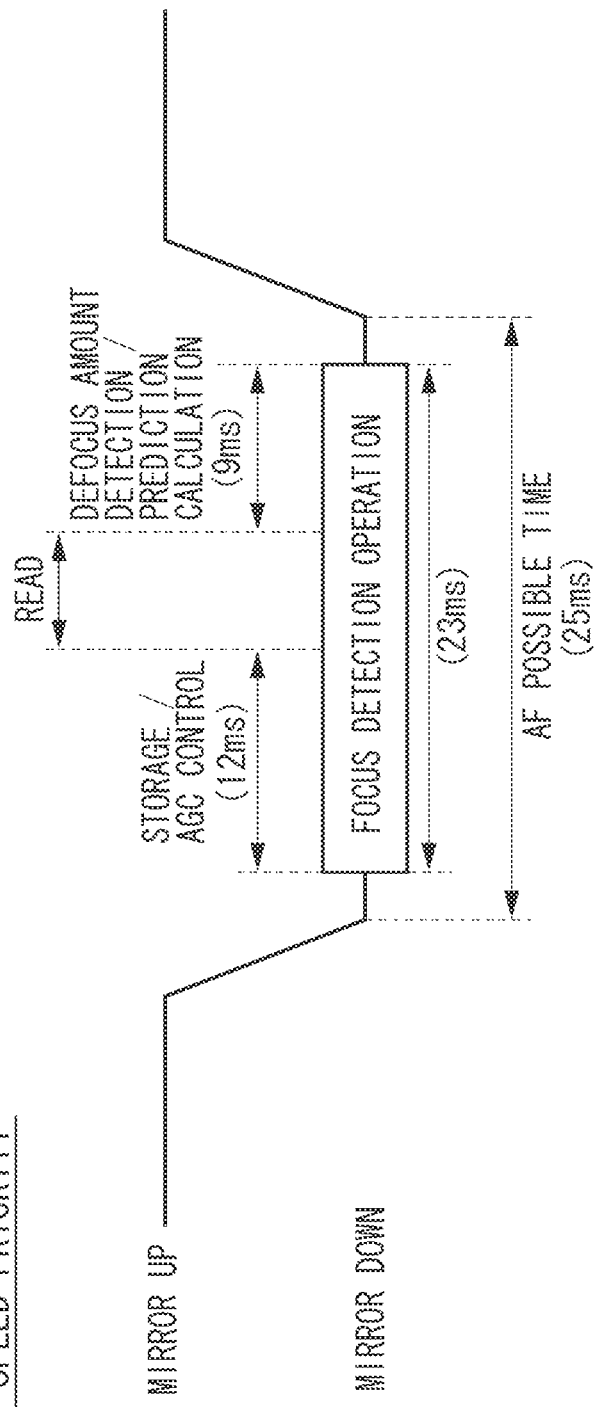
FIG. 12 illustrates adjustment of an AGC control waiting time when shooting speed priority is set.

FIG. 12 illustrates a case in which the focus detection time has been adjusted to 23 ms by shortening the AGC control waiting time 4 ms to hasten signal reading start, so that the focus detection time is within the AF possible time (25 ms).

Figure 13:
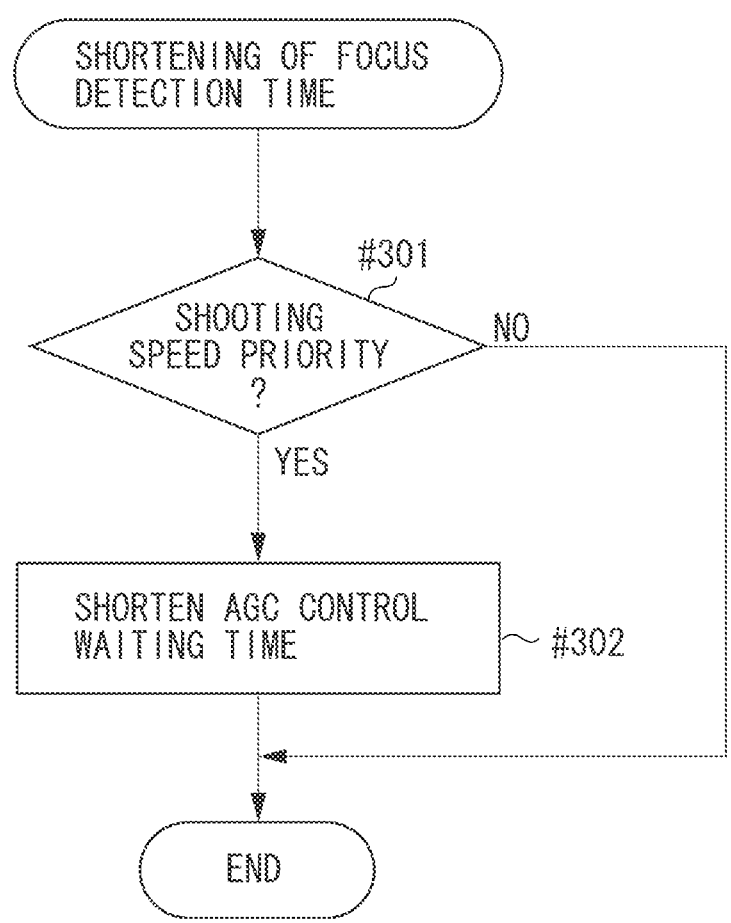
FIG. 13 is a flowchart illustrating processing for adjusting an AGC control waiting time when a user setting is shooting speed priority.

FIG. 13 is a flowchart illustrating processing for shortening an AGC control waiting time based on whether the user has set shooting speed priority or focus priority.

In step S301, if it is determined that the user setting is shooting speed priority (YES in step S301), the processing proceeds to step S302. In step S302, the AGC control waiting time is set to be shorter than the waiting time set for focus priority. If it is determined in step S301 that the user setting is focus priority (NO in step S301), the processing is finished with no change to the current AGC control waiting time setting.

Thus, the AGC control waiting time is adjusted based on the user settings in the frame speed setting, the focus detection point selection setting, and the priority setting.

Further, adjustment of the AGC control waiting time is performed also when a plurality of these user settings has been set, or just one of these user settings has been set.

A second exemplary embodiment according to the present invention will now be described.

In the second exemplary embodiment, optimum focus detection is achieved by, based on the same focus adjustment apparatus configuration and camera configuration as in the first exemplary embodiment, performing the focus detection of the imaging lens 201 using the focus detection unit 210 and controlling the AF sensors 229a and 229b. However, although in the first exemplary embodiment the time adjustment unit 106 illustrated in FIG. 1 adjusts the AGC control waiting time (reading waiting time), in the second exemplary embodiment a prediction calculation time is adjusted.

The control method of the AF sensors 229a and 229b according to the second exemplary embodiment will now be described.

In the second exemplary embodiment, a user makes a setting in which frame speed unevenness tends to occur due to an extension of the focus detection time. In this case, the frame speed unevenness is mitigated by hastening the reading of the object image signals to shorten the focus detection time, while slightly sacrificing AGC control.

The AI-servo is a prediction means that performs lens drive by selecting the most suitable function for predicting a future image plane position based on a plurality of past image plane positions (defocus amount detection results) and changes of the detection times, and predicting changes in a future image plane position based on the selected function.

In the AI-servo prediction calculation, the greater a sample number of past image plane positions and the detection times, the higher accuracy in predicting a change in a future image plane position. However, as its result, the time taken for the prediction calculation lengthens.

The longer the time taken for the prediction calculation, the relatively longer the focus detection times becomes, which makes frame speed unevenness more likely to occur.

The first time shortening process according to the second exemplary embodiment adjusts the focus detection time by determining a sample number of past image plane positions and the detection times thereof to be used in an AI-servo prediction calculation based on a frame speed set by the user.

As described in the first exemplary embodiment with reference to FIG. 5, when the frame speed increases, the focus detection operation may no longer fit within the AF possible time, which can cause frame speed unevenness to occur.

Figure 14:
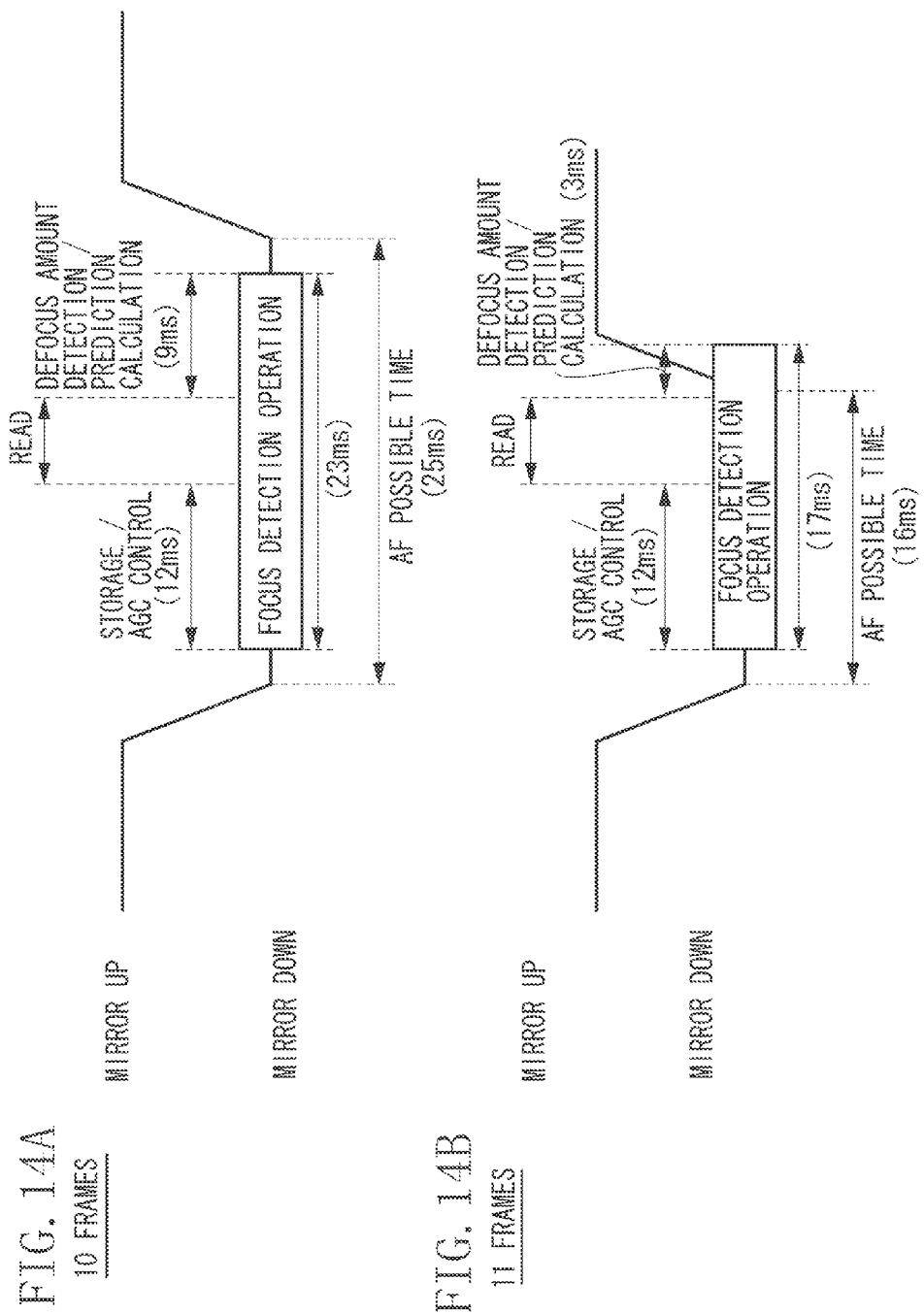
FIGS. 14A and 14B illustrate the occurrence of unevenness in frame speed when frame speed has increased according to a second exemplary embodiment.

As illustrated in FIG. 5, in a case where an AI-servo prediction calculation time is 9 ms when the frame speed is 10 frames, if the frame speed is set to 11 frames, the focus detection time (27 ms) does not fit within the AF possible time (25 ms), so that frame speed unevenness occurs. It is assumed in this case that the sample number of past image plane positions and the detection times thereof to be used in the prediction calculation is 10 when the frame speed is 10 frames. If the frame speed is set to 11 frames, the prediction calculation time is reduced by reducing the sample number to 9 or less. FIG. 14B illustrates a case in which the focus detection time is adjusted to 17 ms by shortening the prediction calculation time to 3 ms, so that although the focus detection time is not within the AF possible time (16 ms), frame speed unevenness is mitigated.

Figure 15:
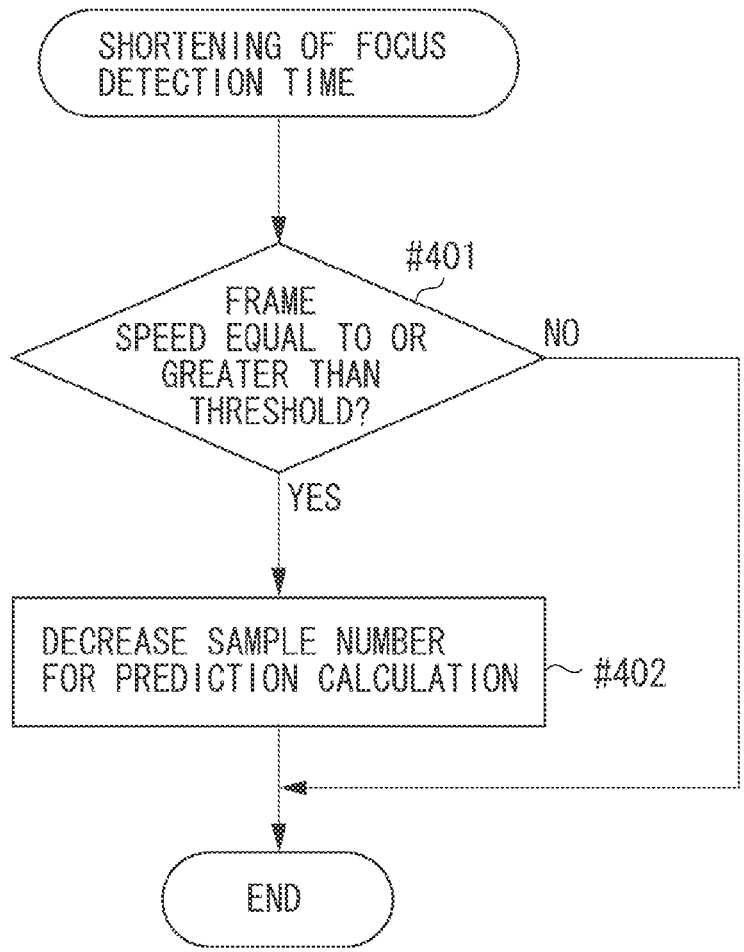
FIG. 15 is a flowchart illustrating processing for adjusting a sample number of past focus detection results to be used in a prediction calculation based on a user's frame speed setting.

FIG. 15 is a flowchart illustrating processing for adjusting the sample number of focus detection results to be used in a prediction calculation based on a frame speed set by the user.

In step S401, if it is determined that the frame speed set by the user is equal to or greater than a predetermined threshold (YES in step S401), the processing proceeds to step S402. In step S402, the sample number of focus detection results to be used in the prediction calculation is reduced, and the prediction calculation is performed. If it is determined in step S401 that the frame speed set by the user is less than the predetermined threshold (NO in step S401), the prediction calculation is performed based on the current sample number of focus detection results to be used in the prediction calculation.

The second time shortening process according to the second exemplary embodiment adjusts the sample number of past image plane positions and the detection times thereof to be used in an AI-servo prediction calculation when the user has set zone selection, automatic selection, or area enlargement selection.

As described in the first exemplary embodiment with reference to FIG. 8, when the focus detection point selection set by the user is zone selection, automatic selection, or area enlargement selection, compared with a case where arbitrary selection is set, the number of line sensors performing storage/reading increases, so that the focus detection time is extended.

Figure 16:
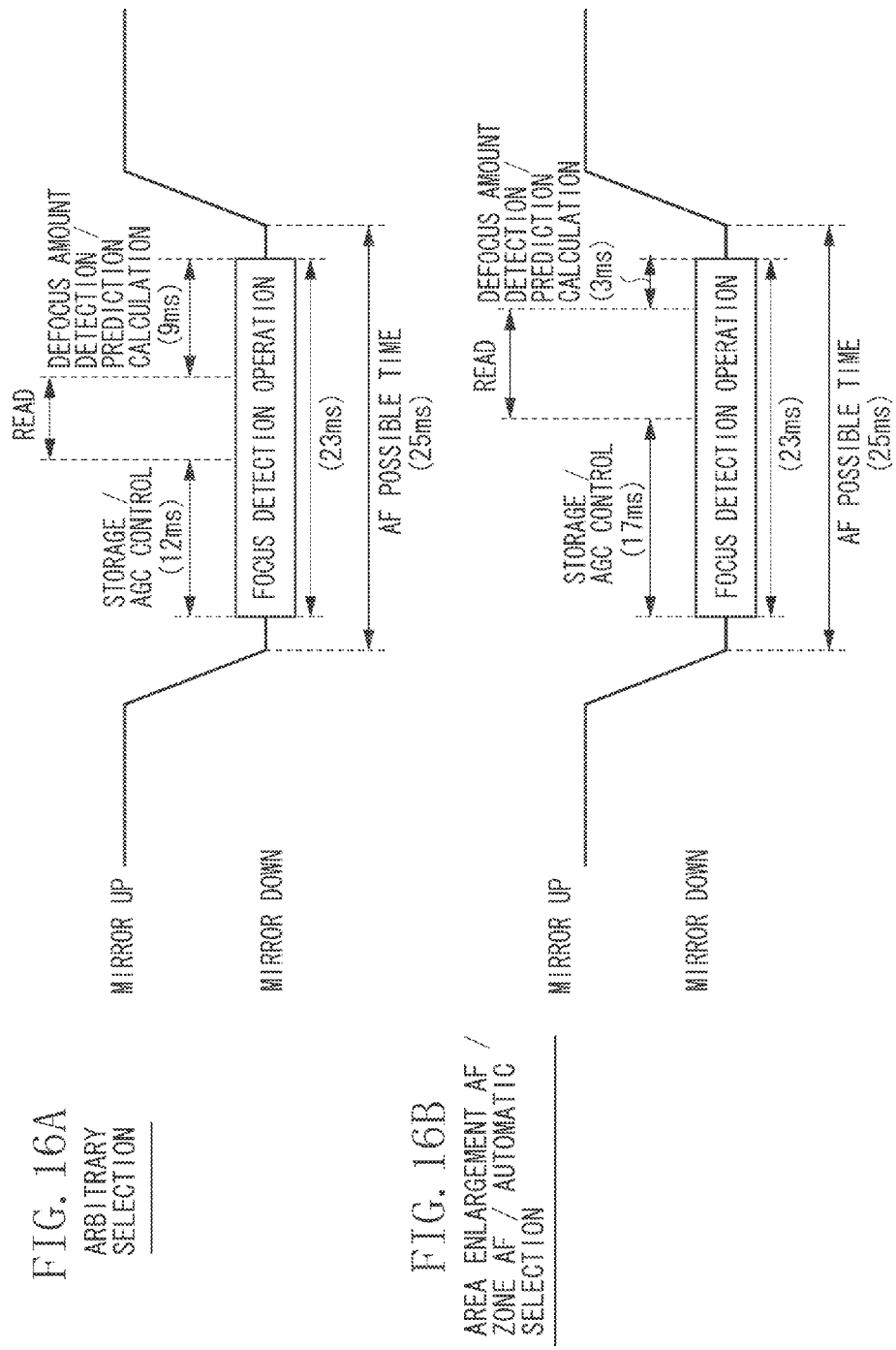
FIGS. 16A and 16B illustrate mitigation of unevenness in frame speed when a storage/read number to an AF sensor has increased.

It is assumed in that case that the sample number of past image plane positions and the detection times thereof to be used in the prediction calculation is 10 for arbitrary selection. If the sample number is reduced to 9 or less for zone selection, automatic selection, or area enlargement selection, the prediction calculation time is reduced. FIG. 16B illustrates a case in which the focus detection time is adjusted to 23 ms by shortening the prediction calculation time to 3 ms, so that the focus detection time is within the AF possible time (25 ms), and frame speed unevenness is mitigated.

Figure 17:
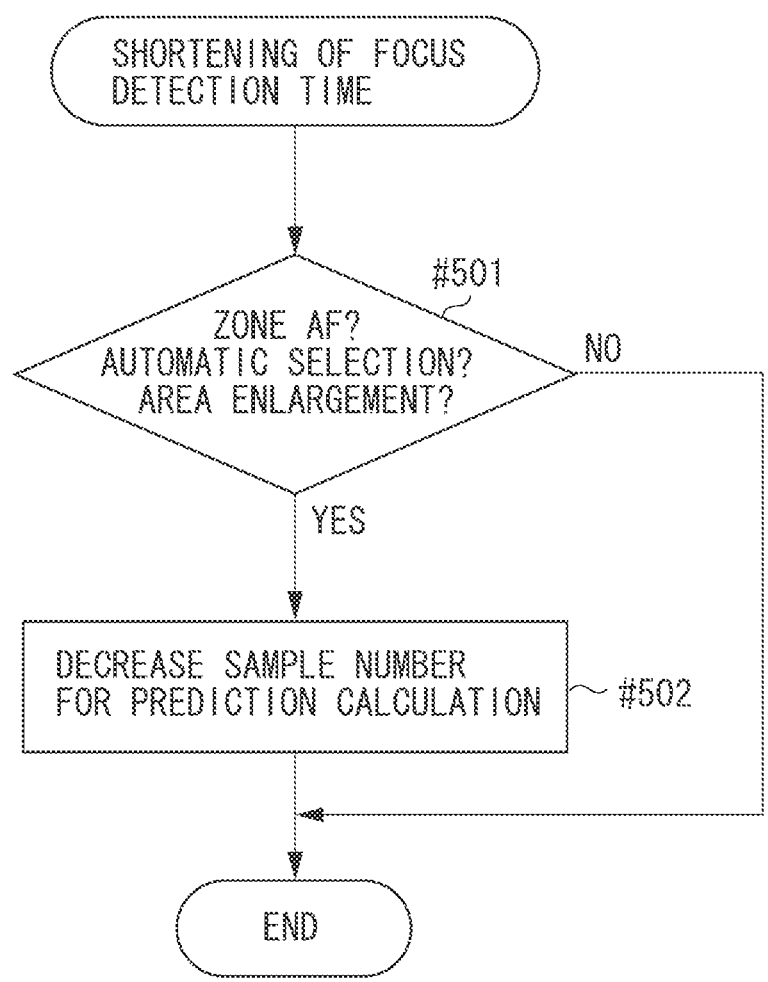
FIG. 17 is a flowchart illustrating processing for adjusting a sample number of past focus detection results to be used in a prediction calculation based on a focus detection point selection set by a user.

FIG. 17 is a flowchart illustrating processing for adjusting the sample number of focus detection results to be used in a prediction calculation based on a focus detection point selection set by the user.

In step S501, if it is determined that the focus detection point selection set by the user is zone selection, automatic selection, or area enlargement selection (YES in step S501), the processing proceeds to step S502. In step S502, the sample number of focus detection results to be used in the prediction calculation is set to be lower than that when arbitrary selection is set, and the prediction calculation is performed. If it is determined in step S501 that the user selects arbitrary selection (NO in step S501), the prediction calculation is performed based on a default sample number setting without change.

The third time shortening process according to the second exemplary embodiment adjusts the sample number of past image plane positions and the detection times thereof to be used in an AI-servo prediction calculation based on whether the user setting is shooting speed priority or focus priority.

As described in the first exemplary embodiment with reference to FIG. 12, when the focus detection operation does not fit within the AF possible time when the user setting is shooting speed priority, frame speed unevenness occurs, so that it may be impossible to shoot at the set frame speed regardless of the fact that priority is given to shooting speed.

Figure 18:
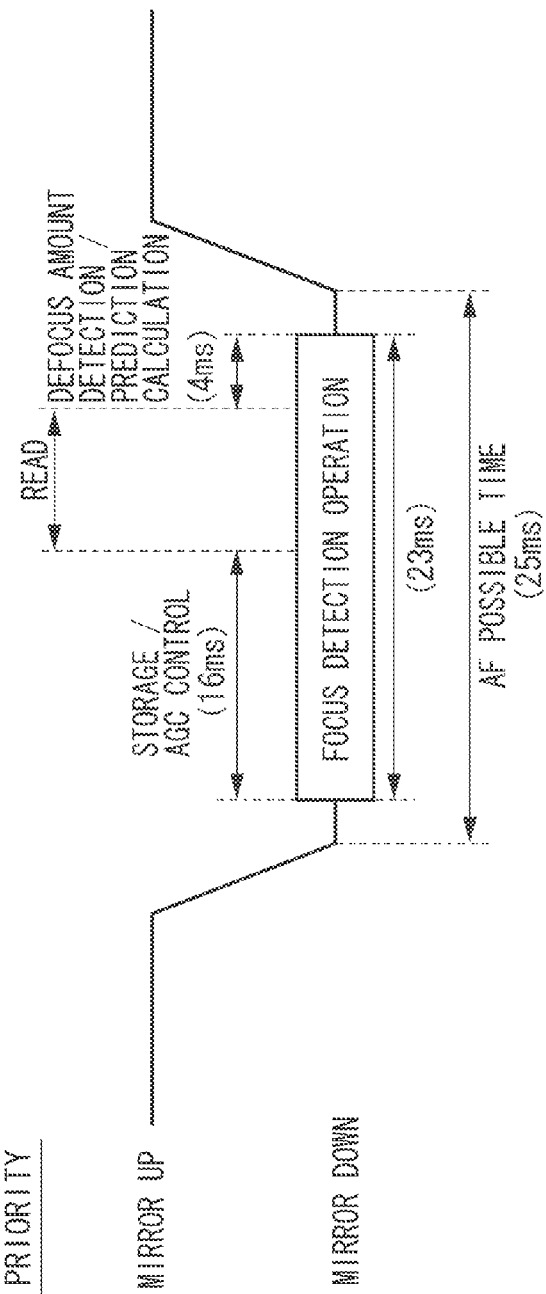
FIG. 18 illustrates mitigation of unevenness in frame speed when shooting speed priority is set.

It is assumed in that case that the sample number of past image plane positions and the detection times thereof to be used in the prediction calculation is 10 for focus priority. In this case, if shooting speed priority is set, the prediction calculation time is reduced by reducing the sample number to 9 or less. FIG. 18B illustrates a case in which the focus detection time is adjusted to 23 ms by shortening the prediction calculation time to 4 ms, so that the focus detection time is within the AF possible time (25 ms), and frame speed unevenness is mitigated.

Figure 19:
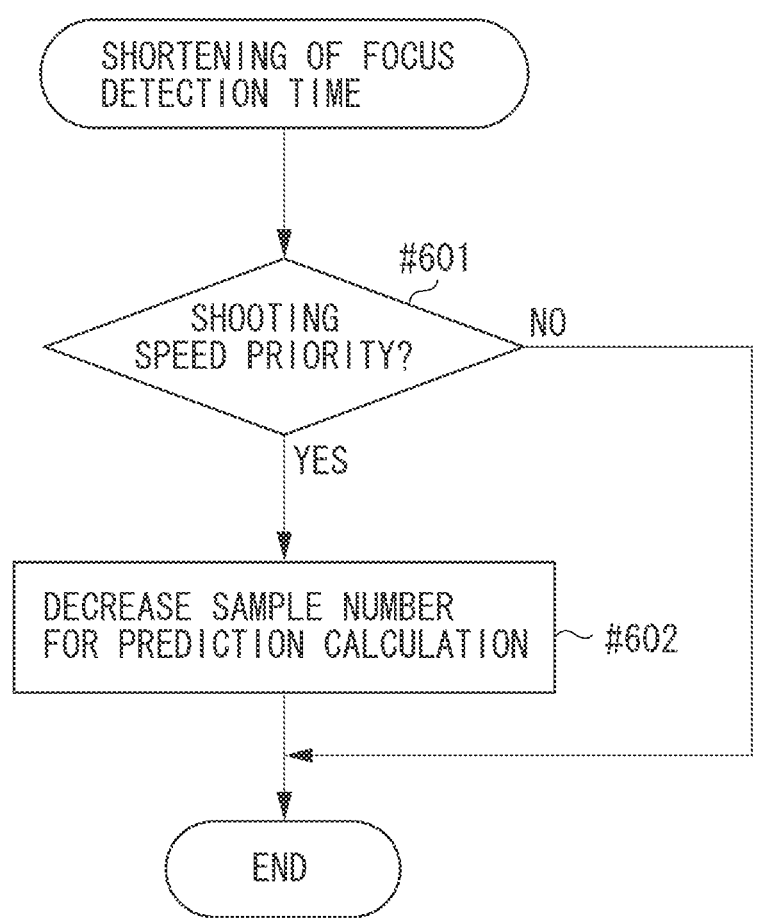
FIG. 19 is a flowchart illustrating processing for adjusting a sample number of past focus detection results to be used in a prediction calculation when a user setting is shooting speed priority.
Figures 21A, 21B:
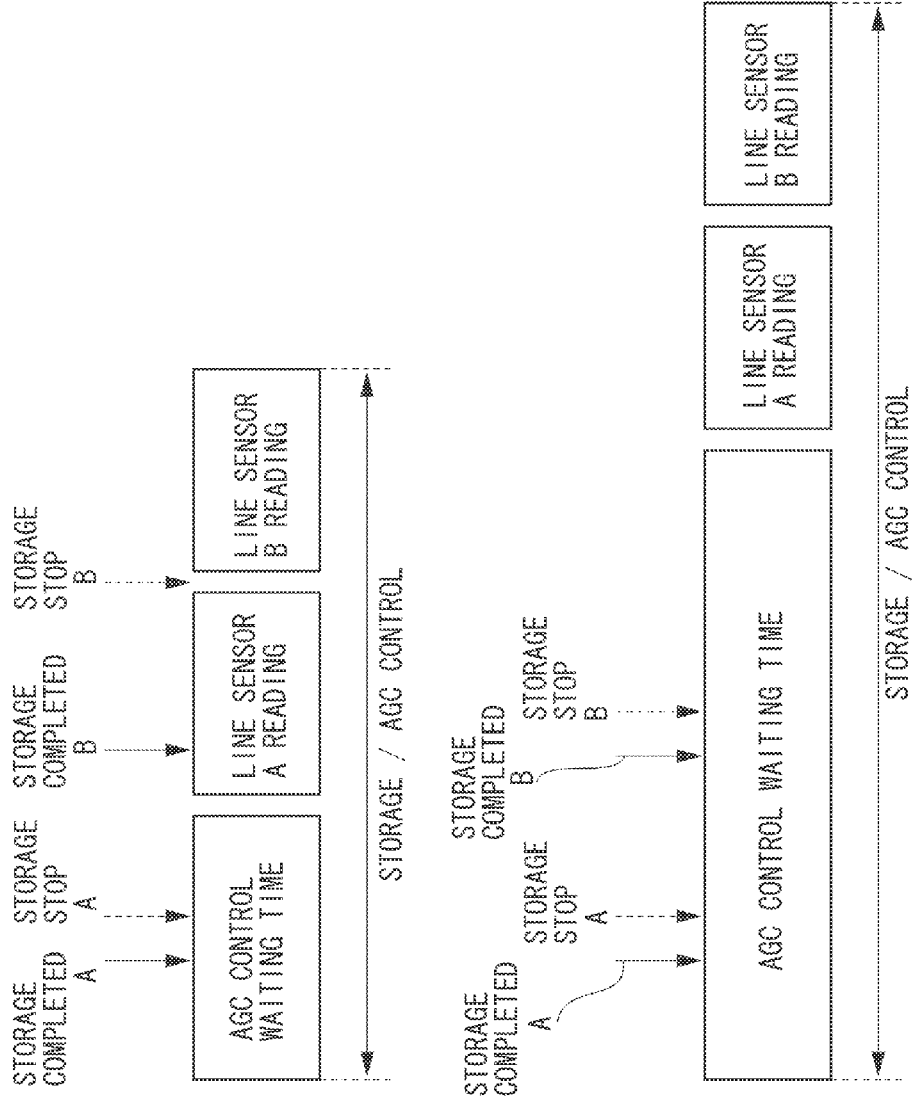
FIGS. 21A and 21B illustrate conventional storage/AGC control.

FIG. 19 is a flowchart illustrating processing for reducing the sample number of focus detection results to be used in a prediction calculation based on whether a user setting is a shooting speed priority setting or a focus priority setting.

In step S601, if it is determined that the user setting is shooting speed priority (YES in step S601), the processing proceeds to step S602. In step S602, the sample number of focus detection results to be used in the prediction calculation is reduced, and the prediction calculation is performed. If it is determined in step S601 that the user setting is focus priority (NO in step S601), the prediction calculation is performed based on a default sample number setting without change.

Thus, the focus detection time is adjusted by adjusting the sample number of the focus detection results to be used in a prediction calculation based on the user settings in the frame speed setting, the focus detection point selection setting, and the priority setting.

Further, the prediction calculation time is adjusted by reducing the sample number of the focus detection results to be used in a prediction calculation whether a plurality of these user settings has been set, or just one of these user settings has been set.

In addition, the focus detection time can be shortened even further, and optimum focus detection can performed based on user settings, by simultaneously performing the shortening of the AGC control waiting time according to the first exemplary embodiment and the shortening of the prediction calculation time according to the second exemplary embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-280842 filed Dec. 22, 2011, which is hereby incorporated by reference herein in its entirety.

What is claimed is:

1. A focus detection apparatus comprising:
a sensor configured to photoelectrically convert an object image signal corresponding to first and second AF areas and output the converted signal via a signal line, wherein a storage time during photoelectric conversion is controlled by the sensor monitoring stored charges via the signal line, and wherein the sensor monitors whether the stored charges have reached a predetermined charge amount; and
a controller configured to detect a defocus amount from the object image signal, wherein the controller performs focus adjustment of an imaging lens based on the defocus amount,
wherein the sensor includes a first mode for outputting via the signal line when respective stored charges corresponding to the first and the second AF areas have reached the predetermined charge amount, and a second mode for outputting via the signal line when respective stored charges corresponding to the first or the second AF areas have reached the predetermined charge amount.

2. The focus detection apparatus according to claim 1, wherein the sensor is configured to switch between the first mode and the second mode based on a user setting.

3. The focus detection apparatus according to claim 1, wherein the sensor can select the second mode during continuous shooting.

4. The focus detection apparatus according to claim 1, wherein the sensor is configured such that a time from starting storage until reading the object image signal is shorter in the second mode than in the first mode.

5. The focus detection apparatus according to claim 1, wherein the sensor is configured to select the first mode and the second mode based on a continuous shooting number per unit time.

6. The focus detection apparatus according to claim 5, wherein the sensor is configured such that the second mode has a greater continuous shooting number per unit time than the first mode.

7. The focus detection apparatus according to claim 1, wherein the sensor is configured such that the first mode and the second mode are selected based on an arbitrary selection mode, an area enlargement selection mode, a zone selection mode, and an automatic selection mode.

8. The focus detection apparatus according to claim 7, wherein the sensor is configured such that the first mode is selected for the arbitrary selection mode.

9. The focus detection apparatus according to claim 7, wherein the sensor is configured such that the second mode is selected based on a selection of any of the area enlargement selection mode, the zone selection mode, and the automatic selection mode.

10. The focus detection apparatus according to claim 1, wherein the sensor is configured such that the second mode is selected when shooting speed priority is set.

11. A method for controlling a focus detection apparatus, the method comprising:

photoelectrically converting with a sensor an object image signal corresponding to first and second AF areas and output the converted signal via a signal line, wherein a storage time during photoelectric conversion is controlled by the sensor monitoring stored charges via the signal line, and wherein the sensor monitors whether the stored charges have reached a predetermined charge amount; and detecting with a controller a defocus amount from the object image signal, wherein the controller performs focus adjustment of an imaging lens based on the defocus amount, wherein the sensor includes a first mode for outputting via the signal line when respective stored charges corresponding to the first and the second AF areas have reached the predetermined charge amount, and a second mode for outputting via the signal line when respective stored charges corresponding to the first or the second AF areas have reached the predetermined charge amount.

* * * * *